United States Patent [19]

Sarkomaa

[11] Patent Number: 5,171,542
[45] Date of Patent: Dec. 15, 1992

[54] CIRCULATING FLUIDIZED BED REACTOR

[75] Inventor: Pertti J. Sarkomaa, Lappeenranta, Finland

[73] Assignee: A. Ahlstrom Corporation, Karhula, Finland

[21] Appl. No.: 700,954

[22] Filed: May 14, 1991

Related U.S. Application Data

[63] Continuation of Ser. No. 302,146, Jan. 27, 1989, abandoned, which is a continuation of Ser. No. 93,781, Sep. 8, 1987, abandoned, which is a continuation of Ser. No. 774,604, Aug. 14, 1985, abandoned.

[30] Foreign Application Priority Data

Mar. 20, 1984 [FI] Finland ................... 841126

[51] Int. Cl.⁵ .................... F27B 15/14; F27B 15/08
[52] U.S. Cl. .................... 422/146; 422/147; 34/57 A; 55/459.1; 122/4 D; 432/15; 432/58
[58] Field of Search ................ 422/146, 147; 34/57 A; 431/7, 170; 432/15, 58; 55/459; 122/4 D

[56] References Cited

U.S. PATENT DOCUMENTS

| | | | |
|---|---|---|---|
| 2,901,420 | 8/1959 | Evans | 422/140 |
| 3,058,817 | 10/1962 | Irani | 422/193 |
| 3,159,494 | 12/1964 | Lawrence et al. | 422/146 |
| 4,165,717 | 8/1979 | Reh et al. | 122/4 D |
| 4,198,290 | 4/1980 | Summers | 209/144 |
| 4,205,965 | 6/1980 | Bielefeldt | 55/1 |
| 4,300,625 | 11/1981 | Mikhailov et al. | 165/95 |
| 4,311,670 | 1/1982 | Nieminen et al. | 422/145 |
| 4,312,301 | 1/1982 | Anson | 122/4 D |
| 4,419,966 | 12/1983 | Jenkins | 122/4 D |
| 4,427,053 | 1/1924 | Klaken | 165/1 |
| 4,473,033 | 9/1984 | Strohmeyer, Jr. | 122/4 D |
| 4,522,154 | 11/1985 | Taylor et al. | 122/4 D |
| 4,594,967 | 6/1986 | Wolowodiuk | 122/4 D |
| 4,664,887 | 5/1987 | Engstrom | 422/147 |
| 4,672,918 | 5/1987 | Engstrom et al. | 122/4 D |
| 4,699,068 | 10/1987 | Engstrom | 110/216 |
| 4,708,092 | 11/1987 | Engstrom | 122/4 D |

FOREIGN PATENT DOCUMENTS

| | | |
|---|---|---|
| 0033808 | 8/1981 | European Pat. Off. . |
| 1442745 | 2/1969 | Fed. Rep. of Germany . |
| 62468 | 9/1982 | Finland . |
| 1325323 | 3/1963 | France . |
| 0148305 | 9/1983 | Japan . |
| 80/00153 | 12/1980 | PCT Int'l Appl. . |
| 85/00027 | 9/1985 | PCT Int'l Appl. . |
| 0879144 | 11/1981 | U.S.S.R. . |
| 2018961 | 10/1979 | United Kingdom . |
| 2034448 | 6/1980 | United Kingdom . |
| 2038670 | 7/1980 | United Kingdom . |
| 2159726 | 12/1985 | United Kingdom . |
| 2160119 | 12/1985 | United Kingdom . |
| 8002652 | 12/1980 | World Int. Prop. O. . |

Primary Examiner—Robert J. Warden
Assistant Examiner—Christopher Y. Kim
Attorney, Agent, or Firm—Nixon & Vanderhye

[57] ABSTRACT

Dynamic fluidized-bed reactor for carrying out a chemical or physical multi-component process, which said reactor comprises a preferably vertical, cooled or uncooled reactor chamber and a preferably horizontal cyclone that discharges the solid matter through the side of the separator chamber and the gases through one end or both ends of the separator chamber. The reactor further comprises a discharge pipe with no gas lock, which allows the solid matter to fall freely. In different applications, the reactor may include feed and discharge means for solid matter as well as a gas distributor grate. Exemplifying embodiments are a fire-tube boiler and a reactor for purification and cooling of hot gases.

9 Claims, 3 Drawing Sheets

CIRCULATING FLUIDIZED BED REACTOR

This is a continuation of application Ser. No. 07/302,146, filed Jan. 27, 1989, now abandoned which is a continuation of application Ser. No. 07/193,781, filed Sep. 8, 1987, now abandoned which is a continuation, of application Ser. No. 774,604, filed Aug. 14, 1985, now abandoned.

The present invention is concerned with a two- or multi-component reactor for carrying out a chemical or physical process. The main components of the reactor are feeder devices for gaseous and/or solid materials, a reactor chamber, and a separator for solid or liquid materials.

Among multi-component reactors, in recent years, so-called fluidized-bed reactors have rapidly become more and more common, and their main field of application has been the production of energy by means of solid fuels. In fluidized-bed reactors, the burning takes place in a solids-gas suspension, whereby the function of the solid and usually non-reactive material is to stabilize the combustion process. The fluidized-bed reactors are divided into two main groups on the basis of their mode of operation:

1) static fluidized-bed reactors, in which the carriage of solid particles along with the carrier gas is scarce, and
2) dynamic fluidized-bed reactors, in which the solid particles are carried pneumatically through the reactor.

The practical applications always include features from both static and dynamic reactors.

Advantages of dynamic fluidized-bed reactors over static reactors are, e.g., the higher cross-sectional area heat release-characteristic, and maybe the most important advantage is better mixing of the gas compounds. A drawback of the dynamic fluidized-bed reactors is absolute necessity of a solids separator. In spite of this drawback, it can be seen that, in the applications of the fluidized-bed technology, there is a tendency towards dynamic fluidized-bed reactors.

As the solids separator in dynamic fluidized-bed reactors, almost exclusively a conventional cyclone is used, whose solids return duct is provided with a so-called gas lock. The function of the gas lock is to prevent flow of gas out of the reactor along the solids return duct into the cyclone. Such a gas flow would have an essentially detrimental effect on the separating capacity of a conventional cyclone. The drawbacks of a conventional cyclone separator are described almost exhaustively in the published Finnish Patent Application No. 812596 in the portion describing the prior-art technology.

In the Finnish Patent Application No. 812596, a reactor based on the use of a flow-through cyclone is described and justifications are given for its advantages as compared with a reactor based on the use of a conventional cyclone. By means of the suggested solution, obvious constructional advantages are obtained in connection with dynamic fluidized-bed applications. The most essential advantages over prior-art reactor solutions are the recirculation system based on natural circulation of the solid matter and operational and constructional advantages related to this. In the invention concerned, certain obvious operational and constructional drawbacks can, however, also be seen, the most essential of which will be discussed in the following.

On the bottom of the particle separator of a reactor in accordance with the Finnish Patent Application No. 812596, solid matter is gathered as a quantity dependent on the loading of the reactor. A gas removing pipe is indispensable for the operation of the separator, which pipe prevents mixing of the solid matter flowing onto the bottom of the cyclone into the clean gas. When the temperature is high, the pipe must be made of a ceramic material and is therefore expensive, massive, and of problematic construction. Moreover, the said pipe constitutes a substantial obstacle for the access of the solid matter gathered onto the bottom of the separator into the discharge pipe. In practice, the surface of the circulating material in the bottom part of the flow-through cyclone tends to adopt a position and shape dependent on the said material, on the reactor, and on the loading, and the said position and shape is, as a rule, unfavourable in view of the flow pattern of the cyclone. In order that a good separating ratio should be achieved, some of the volume of the cyclone is needed between the gas removing pipe and the cyclone chamber exclusively for the storage of the solid matter that is gathered.

By means of a multi-component reactor in accordance with the present invention, based on a horizontal cyclone, it is possible to eliminate the problems and drawbacks of the fluidized-bed reactors based on the use of vertical cyclones (conventional cyclone, flow-through cyclone). The reactor in accordance with the invention is characterized in what is stated in the characterizing part of claim 1.

Some of the most important advantages of the present invention are the constructional simplifications obtained in various embodiments of dynamic fluidized-bed reactors as well as operational improvements achieved as compared with prior-art reactors. When a horizontal cyclone is used, it is possible to avoid the operational and constructional drawbacks characteristic of the flow-through cyclone, resulting from the storage of the solid matter. The use of a horizontal cyclone also yields economies of investment, because the reactor becomes constructionally simple and of a small size as compared with the prior-art reactor solutions. A horizontal separator operates even more stably than a flow-through cyclone, because the removal of the solid matter is performed from the circumference of the separator chamber. The said location of the solids removing pipe also provides an increase in the carrying capacity of the discharge pipe, because, when it arrives in the discharge pipe, the solid matter has a high velocity (mass flow = cross-sectional area × velocity × density). Owing to their said properties, the horizontal cyclones are particularly well suitable for being connected in series.

The reactor in accordance with the invention, based on a horizontal cyclone, is particularly suitable for a fully cooled reactor part of the fire-tube boiler shown in FIG. 3, because the shapes of the reactor, of the separator, and of the gas and return pipes are favourable in view of heat expansion.

Examples on certain embodiments of the invention are given in FIGS. 1, 2 and 3, with reference to which the invention will be described in more detail in the following.

Figure 1:
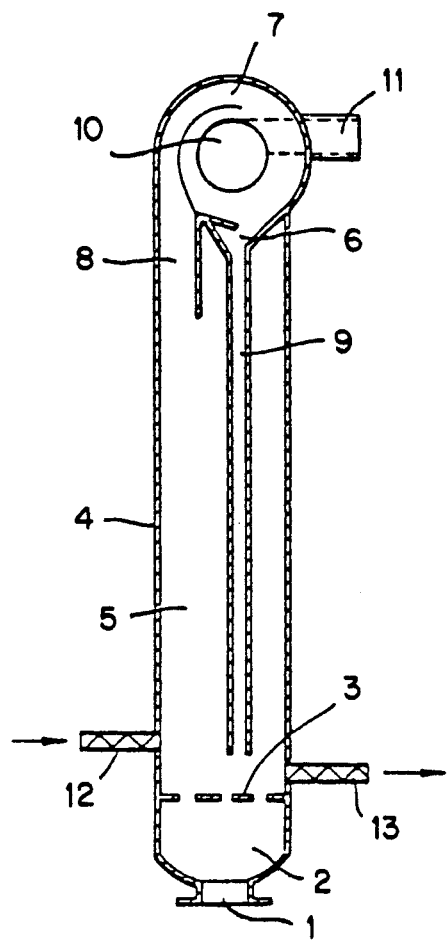
FIG. 1 shows a dynamic fluidized-bed solution in accordance with the invention as applied to combustion under complete or partial oxygenation, or for carrying out a certain chemical or physical process.
Figure 1A:
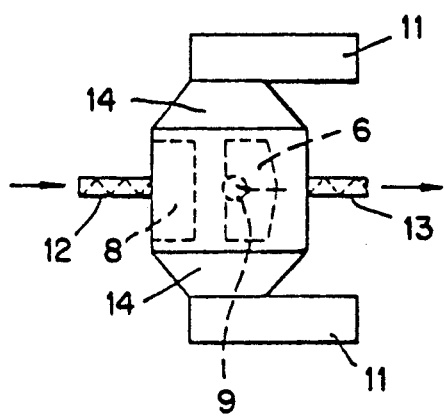

FIG. 1 shows the construction and the mode of operation of a dynamic fluidized-bed reactor based on a horizontal cyclone as applied to combustion or, more generally, to carrying out a desired multi-component process. The process gas is passed into the reactor through the inlet opening 1 of the air chamber 2 placed in the bottom part of the reactor. Via the gas distributor plate 3 placed between the reactor chamber 5 and the air chamber 2, the gas is passed into the bottom part of the reactor chamber 5, into which the solid material separated in the horizontal separator is passed through the return pipe 9. The solid process material is fed into the reactor through the branch 12. The solid process product or waste is removed through the branch 13. The mantle 4 of the reactor chamber 5 may be cooled, and the reactor chamber may also have cooling elements. The gas containing solid matter is passed through the duct 8 tangentially to the circumference of the horizontal separator chamber 7 of the horizontal cyclone placed above the reactor chamber 5. The solid material separated out of the horizontal cyclone onto the wall is removed via a branch 6 placed on the circumference of the separator chamber, from which duct, the solid material is passed further along the return pipe 9 to the desired location of the reactor. The gases purified in the horizontal cyclone are removed via both ends of the cyclone through the openings 10. The exhaust gas branches 11 can be connected to the branches 10 tangentially, whereby some of the tangential velocity of the exhaust gas can be recovered.

Figure 2:
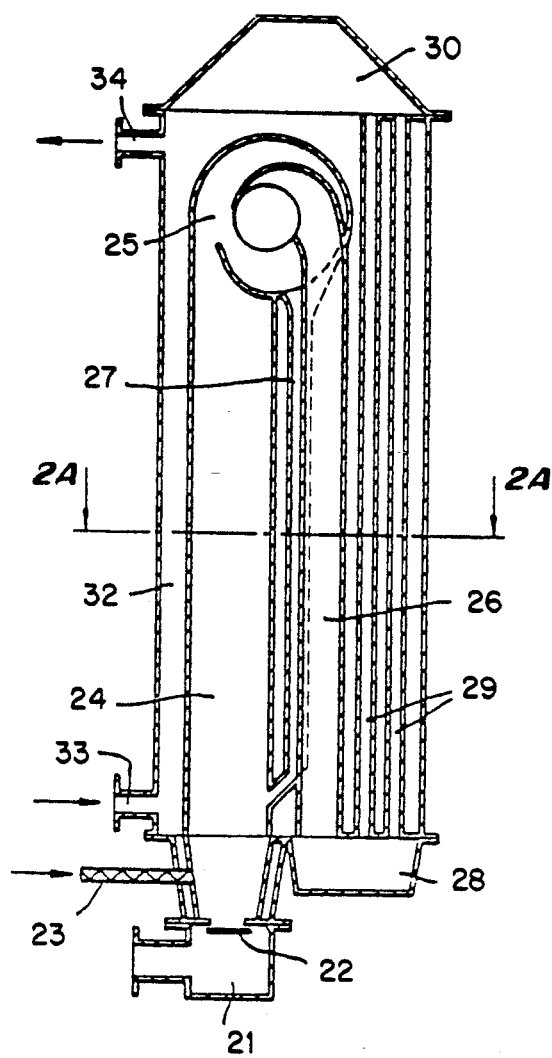
FIG. 2 shows a reactor solution in accordance with the invention as a part of a fire-tube boiler.
Figure 2A:
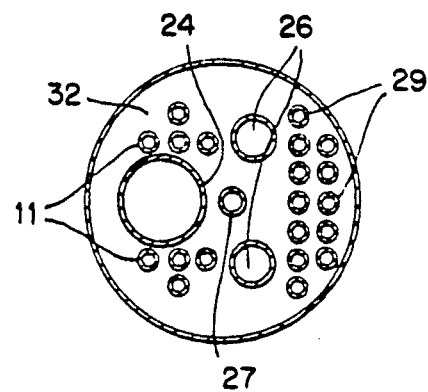

FIG. 2 shows the construction of principle of a fire-tube boiler accomplished by means of a reactor of the sort shown in FIG. 21. The combustion air is passed from the air chamber 1 via the air distribution plate 22 into the combustion chamber 24, into whose bottom part the fuel is fed through the branch 23. The reactor in accordance with the invention, operating in accordance with the principles indicated in the description of FIG. 1, is completely placed in a water space 32 and is, thus, fully cooled. The exhaust gas ducts 26 of the horizontal separator 25 pass the gases purified of solid matter into the lower reversing chamber 28. In the fire tubes 29, the gases are cooled further and pass into the upper reversing chamber 30, and from there further through the pipes 31 into the system of flue gas ducts. The solid material is returned through the pipe 27 to an appropriate level in the combustion chamber 24. The branches 33 and 34 are the inlet and outlet ducts for the cooling water.

Figure 3:
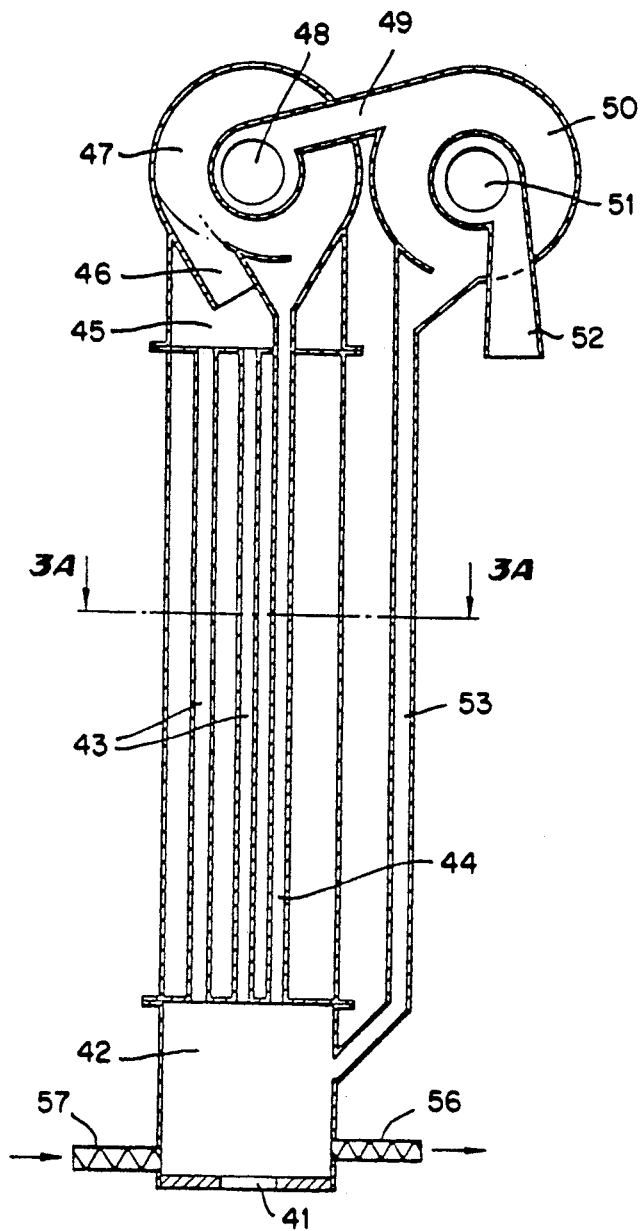
FIG. 3 shows a reactor solution in accordance with the invention as applied to the cooling, heat recovery, and purification of hot gases possibly containing gaseous and/or molten and vaporous and/or solid impurities.
Figure 3A:
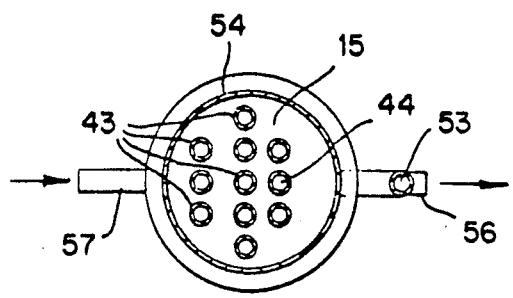

FIG. 3 shows the reactor solution in accordance with the invention as applied to the purification of hot gases and to the recovery of heat, accomplished by means of two flow-through cyclones connected in series. The hot gases to be purified are passed into the reactor through the opening 41. In the bottom part of the reactor space, there is a mixing chamber 42, into which the solid material is returned through the return pipes 44 and 53, and into which the necessary solid process material, if any, is fed (e.g., $CaCO_3$ for the absorption of sulphur oxides) through the branch 57. If necessary, process material or waste (e.g., $CaSO_4$) can be removed out of the mixing space 42 through the branch 56. The solid materials and the gas rise through the pipes 43 into the collecting space 45. Through the branch 46, the gases containing solids are passed tangentially to the circumference 47 of the first horizontal cyclone. The pre-purified gases are removed out of the first separator through one end or both ends of the separator chamber through the openings 48. The separated solid matter is returned into the mixing part 42 through the pipe 44. Through the branch 49, the pre-purified gases are passed to the circumference of the separator chamber 50 of the second horizontal separator. The pure gases are removed through the ends of the second horizontal separator through the openings 51. The separated solid matter is returned through the discharge pipe 53 into the mixing part 42. In order to reduce losses of pressure, the gas ducts 49 and 52 are attached to the discharge openings 48 and 51 tangentially. The cooling of the reactor part in FIG. 3 is accomplished as a fire-tube construction, whereby the tubes 3 and 44 are located in a water space 15 formed by the mantle 54.

From the horizontal separator shown in FIG. 1, the gases are removed symmetrically, and the ends of the separator chamber are conical. It is clear that the ends of the separator chamber may also be plane and that the gas may also be removed from one side only. If necessary, the discharge pipes 10 of the horizontal separator may also extend into the separator chamber 7. In FIG. 1, a practical connection between the reactor chamber and the horizontal separator is shown, but it is clear that the separator may be located, e.g., eccentrically relative the reactor chamber and that the return duct for the solid matter may also be located outside the reactor chamber.

The cooling part of the embodiment shown in FIG. 3 consists of fire tubes placed inside the mantle. It is obvious that the cooling may also be accomplished by means of water tube constructions. It is also evident that, if necessary, even more than two separators may be connected in series and/or in parallel.

Even otherwise, it should be stated that, above, the reactor invention has been described just in the light of three exemplifying embodiments. This is, however, not supposed to confine the field of application of the invention concerned to the given example cases only. It is also obvious that, in the present application, different modifications can be produced of the basic solutions, which said modifications are inventionally included in the scope of the present application.

What is claimed is:

1. A dynamic fluidized bed reactor apparatus for purifying and cooling hot gases, comprising:

a fluidized bed reactor chamber having upper and lower ends and further having a means for fluidizing a bed of solid material, in which solid particles are at least partly carried pneumatically upwards through the reactor chamber in a solids-gas suspension, said reactor chamber further comprising a mixing chamber in said lower end;

said fluidizing means being defined by a first inlet in said mixing chamber for introducing hot gases to be purified and cooled into said reactor;

a second inlet for introducing solid process material into said reactor;

a first outlet in the lower end of the reactor for removing solid process material from said reactor;

a first horizontal cyclone separator disposed at the upper end of the reactor for separating solid material from said solids-gas suspension received from said reactor chamber through said first outlet, said solids-gas material passing into the horizontal cyclone separator tangentially to the circumference of a separator chamber of the horizontal cyclone separator;

a return pipe connected to the circumference of the first horizontal cyclone separator for returning separated solid material to said mixing chamber;

exhaust means at at least one end of the first horizontal cyclone separator for discharging purified gas from the separator; and cooling surface means extending between said mixing chamber and said first outlet of said reactor chamber cooperating with cooling means in said reactor chamber for cooling said solids-gas suspension in the reactor as said solids-gas suspension flows from said mixing chamber to said first outlet.

2. The apparatus as claimed in claim 1, and wherein said cooling surface means comprises a plurality of pipes extending upwardly from said mixing chamber to said first outlet, said pipes fluidly communicating with a collecting space adjacent an inlet to said horizontal cyclone separator, said hot gas and bed material directed to flow through said plurality of pipes.

3. The apparatus as claimed in claim 2, wherein said cooling means comprises a water jacket in said reactor chamber defined by said upper and lower ends of said reactor chamber and surrounding said plurality of pipes.

4. The apparatus as claimed in claim 1, futher comprising a plurality of return pipes connected to the circumference of the first horizontal cyclone for returning separated solid material to said mixing chamber.

5. The apparatus as claimed in claim 1, futher comprising a second horizontal cyclone connected to said exhaust means for providing further separation of solid material from the gas discharged from said first horizontal cyclone.

6. The apparatus as claimed in claim 1, wherein said return pipe is connected to the circumference of the first horizontal cyclone at a point appoximately midway between opposite end portions of the first horizontal cyclone, each end containing exhaust means for discharging purified gas.

7. The apparatus as claimed in claim 1, wherein the return pipe is disposed within the reactor chamber.

8. The apparatus as claimed in claim 1, wherein said return pipe does not contain a gas lock and allows the solid material to fall freely therethrough.

9. The apparatus as claimed in claim 1, wherein said first inlet in said mixing chamber comprises a single conduit opening into said mixing chamber.

* * * * *